US006594050B2

(12) United States Patent
Jannson et al.

(10) Patent No.: US 6,594,050 B2
(45) Date of Patent: Jul. 15, 2003

(54) OPTICAL COMMUNICATION SWITCH NODE

(75) Inventors: Tomasz P. Jannson, Torrance, CA (US); Guoda Xu, Redondo Beach, CA (US); Freddie Lin, Redondo Beach, CA (US)

(73) Assignee: Physical Optics Corporation, Torrance, CA (US)

( * ) Notice: Subject to any disclaimer, the term of this patent is extended or adjusted under 35 U.S.C. 154(b) by 33 days.

(21) Appl. No.: 09/753,979

(22) Filed: Jan. 3, 2001

(65) Prior Publication Data

US 2003/0081287 A1 May 1, 2003

(51) Int. Cl.[7] .......................... H04J 14/08; H04J 14/00; H04B 10/00

(52) U.S. Cl. ........................ 359/139; 359/117; 359/165

(58) Field of Search ................................ 359/117, 139, 359/165

(56) References Cited

U.S. PATENT DOCUMENTS 4,894,818 A * 1/1990 Fujioka et al. .............. 359/117
5,138,489 A * 8/1992 Paek ........................... 359/29
5,262,979 A * 11/1993 Chao .......................... 359/561
5,526,298 A * 6/1996 Mukohzaka ................. 365/49
6,211,979 B1 * 4/2001 Kang et al. ................. 359/117

* cited by examiner

*Primary Examiner*—Leslie Pascal
*Assistant Examiner*—Dalzid Singh
(74) *Attorney, Agent, or Firm*—Leonard Tachner

(57) ABSTRACT

A self-routing switching node that includes an optical associative memory processor that receives packet header information and a switching array coupled to the optical associative memory processor. The switching array receives control signals from the optical associative memory processor. The self-routing switching node also includes a buffer memory coupled to the optical associative memory processor that stores data packet information. The self-routing switching node further includes a vertical cavity surface emitting laser that transforms electronic packet header information into optical header information.

8 Claims, 10 Drawing Sheets

1100
1150
1140
1130
1120
1110
f'
2f
2f
D
d
θ
θ
2b

OPTICAL COMMUNICATION SWITCH NODE

BACKGROUND OF THE INVENTION

1. Field of Invention

The present invention is directed to an optical switch node. In particular, the present invention is directed to a self-routing switching node based on an optical associative memory and noncoherent pattern recognition techniques.

2. Description of Related Art

The increasing demand for high capacity communication links is being driven by data-intensive services on the Internet. For example, high capacity communications transmitted through links include multimedia information, multiparty video conferencing, video-on-demand, telemedicine, and database searching. Digital data transfer rates over commercial point-to-point fiber optic media currently run into the gigabit-per-second range, and will soon surpass the 10 Gb/s rate. While this represents an advance of just a single order of magnitude, the distinction between 1 Gb/s and 10 Gb/s is significant as the data rate for optically transmitted signals is currently overtaking the speed of commercially available electronics technology. Given the demand for multi-Gb/s speeds and the inability of conventional electronic equipment to keep pace with fiber optic transmission speeds, the development of novel Gb/s opto-electronic data processing components constitutes a critical technology area.

ATM Standard

A significant amount of data is currently transmitted using the Asynchronous Transfer Mode (ATM) communications standard. ATM is a self-routing means of sending data over a network. Instead of relying on a single external controller to route data through the entire network from a source to a destination, ATM places a routing header of five bytes onto the front of a packet of data. The basic data unit in the ATM network is called a "cell" that has a fixed size of 53 bytes including a "payload" (the data portion) of 48 bytes and the "header" of 5 bytes. Each node in the network typically has a modest number of inputs and outputs (e.g., between 4 and 100). At each node in the network, the header information is read so that the node can autonomously decide where to send the packet next in the network. By consulting a switch routing table in the node, the packet "finds" its way from its source to its final destination.

ATM technology has its history in the development of broadband ISDN in the 1970s and 1980s. From a technical view, ATM is an evolution of packet switching. Similar to packet switching for data (e.g., X.25, frame relay, transmission control protocol [TCP]/Internet protocol [IP]), ATM integrates the multiplexing and switching functions, and is typically a good match for bursty traffic (in contrast to circuit switching). Additionally, ATM allows communication between devices that operate at different speeds. Unlike packet switching, ATM generally supports high-performance, multimedia networking and has been implemented in a broad range of networking devices including PCs, workstations, server network interface cards, switched-Ethernet and token-ring workgroup hubs, workgroup and campus ATM switches, ATM enterprise network switches, ATM multiplexers, ATM-edge switches, and ATM-backbone switches.

ATM is also a capability that can be offered as an end-user service by service providers (as a basis for tariffed services) or as a networking infrastructure for these and other services. The most basic service building block is the ATM virtual circuit, which is an end-to-end connection that has defined end points and routes, but does not include dedicated bandwidth. Bandwidth is allocated on demand by the network as users have traffic to transmit.

The ATM connection standard organizes different streams of traffic in separate calls, thereby allowing the user to specify the resources required and the network to allocate resources based on these needs. Multiplexing multiple streams of traffic on each physical facility (between the end user and the network or between network switches), combined with the ability to send the streams to many different destinations, results in cost savings through a reduction in the number of interfaces and facilities required to construct a network.

ATM standards define (1) virtual path connections (VPCs), which contain (2) virtual channel connections (VCCs). A virtual channel connection (or virtual circuit) is the basic unit, which carries a single stream of cells, in order, from user to user. A collection of virtual circuits can be bundled together into a virtual path connection. A virtual path connection can be created from end-to-end across an ATM network. In this case, the ATM network does not route cells belonging to a particular virtual circuit. All cells belonging to a particular virtual path are routed the same way through the ATM network, thus resulting in faster recovery in case of major failures.

An ATM network also uses virtual paths internally for the purpose of bundling virtual circuits together between switches. Two ATM switches may have many different virtual channel connections between them, belonging to different users. These can be bundled by the two ATM switches into a virtual path connection that serves the purpose of a virtual trunk between the two switches. The virtual trunk is then handled as a single entity by, perhaps, multiple intermediate virtual path cross connects between the two virtual circuit switches.

Virtual circuits are statically configured as permanent virtual circuits (PVCs) or dynamically controlled via signaling as switched virtual circuits (SVCs). They can also be point-to-point or point-to-multipoint, thus providing a rich set of service capabilities. SVCs are often the preferred mode of operation in a network because they can be dynamically established, thereby minimizing reconfiguration complexity.

Switching

As discussed above, with the development of the ATM standard as the specification for a broadband communication network, the switching requirements of a network in terms of speed and function have increased significantly. In this regard, packet switching is based on the concept of statistical multiplexing onto the digital links, which implies that the use of large and very fast memories is of paramount importance. Even more important than the concept of statistical multiplexing is the fact that packet switching is performed on a packet-by-packet basis and not a connection-by-connection basis as with circuit switching. In circuit switched networks, the control memories of TSIs and TMSs are under the control of a central CPU that changes their configurations as connections are set up and torn down. With packet switching, however, each packet carries its own identifier called a "routing table" that instructs the node where the packets have to be switched (routed). Therefore, a large amount of processing is required in a packet-switched node, and the connecting network of a packet switching node is likely to change its input/output connection pattern with a rate related to the transmission time of a packet. Based on the well-known seven layer protocol architecture of the OSI model, the routing function for classical X.25 low-speed networks belongs to the network layer, whereas the forwarding one is associated with the data link and physical layers.

Optical Switching

Optical space switches are analogic devices that physically route an optical flow from an input to a selected output. Most of the present electronic switches are instead essentially based on the digital cross-points (e.g., based on CMOS, fast access RAM and electronic buffers). The optical switches are in a sense more similar to the earliest electromechanical or semi-electronic implementations of a crossbar network in the space domain than to the modern fully electronic switches operating both in the time and space domains.

Large switching matrices are composed by connecting small switching devices (switching elements) according to various architectures. Photonic space switching matrices are subdivided according to the kind of interconnection optical hardware being used (e.g., free-space, optical fibers or integrated optical waveguides). The networks are also classified according to the technology used to implement the switching elements.

Until recently, the rates at which data was transmitted over a fiber optic link and the speeds of electronic switching elements were roughly compatible. Fiber optic data rates of 155 Mb/s to 2.5 Gb/s corresponded well with the speed of high-end RISC microprocessors. In the past, therefore, it was reasonable to use such processors to read the routing headers from each of the incoming channels, decode them, and decide how to route the data back out to the network. While the speed of electronic microprocessors continues to advance at an impressive pace, the speed of fiber optic data links is also increasing at an impressive pace. Fiber optic links operating at 10 Gb/s and beyond are literally in a position to overtake and overwhelm even the most advanced electronic microprocessors.

This emerging disparity in speed between fiber optic data transmission and the microprocessors which route the data through a given communication network poses a serious technological problem. At each node of the network, high speed data piles up in buffers while the routing processor reads the header information from each channel and determines the appropriate switch settings to send the data further on its way through the network. Consider, for example, a node that routes 10 input channels to 10 output channels, where each channel carries data at a relatively modest rate of 10 Gb/s (e.g., the OC-192 rate). An ATM cell of 53 bytes takes roughly 42 nsec to arrive from start to finish, which is slightly less than 21 clock cycles of a 500 MHz microprocessor. It is unlikely that any microprocessor design could successfully route 10 channels in so few clock cycles (a more likely number of clock cycles is on the order of ~2000). Even a 10-element parallel processor scheme can only result in a total of a ~400 ns processing time, which is still ten times longer than the OC-192 ATM cell duration time of ~42 ns.

Therefore, while the processor wastes time determining the appropriate routing for channels through a node, data continues to pile up in the node's buffer. While sufficient memory may be integrated into receiver circuitry to accommodate the accumulated data while the processor makes routing decisions, it is clear that no amount of memory is sufficient after repeating this process an arbitrary number of times for bursty data. Therefore, the processor must make a routing decision in less time than it takes to load a subsequent ATM cell.

If data processing time is longer than 42 ns, a high-speed buffer memory is needed to store the next incoming ATM cell in each channel. Buffer memory with a large storage capacity is required to avoid ATM cell loss during peak network traffic. For an ATM network that operates at 10 Gb/s and beyond, electronic data processing techniques fall short of what is needed for efficient ATM network operation. Accordingly, the primary bottleneck in electronic ATM switches is the slow data processing speed.

Photonic processing techniques such as time division multiplexing (TDM), wavelength division multiplexing (WDM), code division multiplexing (CDM), and their combinations are often used for self-routing. These conventional self-routing techniques determine routing control signals based only on header information embedded by a different time slot, a different optical wavelength, or a different code sequence, rather than by an address-bit field defined in the ATM network standard. Thus, it is difficult to retrofit these photonic techniques into the ATM network operation. The range of switching times achievable by these photonic techniques indicates that optical space and wavelength switching is more suitable for circuit switching than for packet switching networks (especially if packets are as short as in ATM).

Furthermore, these photonic processing techniques cannot handle switching contention problems when more than one header has the same forwarding address (e.g., the same time allocation in TDM, the same wavelength channel allocation in WDM, or the same code sequence in CDM). Therefore, this switching contention problem significantly degrades the performance of a self-routing switching node.

Finally, these conventional techniques cannot handle multiple-hop stage networks. By inserting particular header information into a data packet stream, a switching node can determine the switching function and switch a given input channel to a given output channel in one stage. When there are multiple hops in the network, as there often are in self-routing networks, advanced technologies such as all-optical time slot interchange, all-optical wavelength converters, and all-optical code sequence converters are needed. Unfortunately, these all-optical technologies are still primarily in the research and development stage.

SUMMARY OF THE INVENTION

It is an object of this invention to provide a self-routing switching node that includes an optical associative memory that receives packet header information, and a switching array that is coupled to the optical associative memory and receives control signals from the optical associative memory.

Yet another object of this invention is to provide a method of operating a self-routing switching node including the steps of receiving header information for a data packet, transmitting the header information through an optical mask, detecting routing information based on the header information transmitted through the optical mask, and transmitting control information to a switch based on the detected routing information.

Another object of this invention is to provide a light imaging quasi-orthogonal self-routing switching node including a header coding module that transforms a set of header data associated with a data packet from an electrical signal into an optical signal, an electro-optic page composer module that receives the optical signal from the header coding module, an image spatial fan-out distribution module that distributes the optical signal from the electro-optic page composer, and an image recognition module that routes the set of header data to a destination address.

Yet another object of this invention is to provide a self-routing switching node including a plurality of input fibers including a set of data packets, a buffer memory unit wherein the set of data packets is temporarily stored and wherein a set of header bits associated with each data packet in the set of data packets is copied, an optical heteroassociative data mapping processor that processes the copied set of header bits by converting a given input pattern into a corresponding output pattern based on a desired mapping algorithm, generates a set of memory control signals, and transmits the set of memory control signals to the buffer memory unit to access a set of desired data packets, and a switching array that receives the set of data packets from the plurality of output communication ports and routes the set of data packets based on a set of routing control signals from the data mapping processor.

Another object of this invention is to provide a self-routing switching node including a plurality of input fibers including a set of optical data packets, a plurality of input communication ports that convert the set of optical data packets into a set of electrical data packets, a buffer memory unit wherein the set of electrical data packets is temporarily stored and wherein a set of header bits associated with each data packet in the set of electrical data packets is copied, an optical heteroassociative data mapping processor that processes the copied set of header bits by converting a given input pattern into a corresponding output pattern based on a desired mapping algorithm, generates a set of memory control signals, and transmits the set of memory control signals to the buffer memory unit to access a set of desired data packets, a plurality of output communication ports that converts the set of desired electrical data packets into an optical set of data packets, and a switching array that receives the optical set of data packets from the plurality of output communication ports and routes the optical set of data packets based on a set of routing control signals from the data mapping processor.

Yet another object of this invention is to provide a self-routing switching node including a plurality of input fibers including a set of data packets, a buffer memory unit wherein the set of data packets is temporarily stored and wherein a set of header bits associated with each data packet in the set of data packets is copied, an optical digital heteroassociative data mapping processor that processes the copied set of header bits by converting a given input pattern into a corresponding output pattern based on a desired mapping algorithm, generates a set of memory control signals, and transmits the set of memory control signals to the buffer memory unit to access a set of desired data packets, and a switching array that receives the set of data packets from the plurality of output communication ports and routes the set of data packets based on a set of routing control signals from the data mapping processor.

Another object of this invention is to provide a data mapping processor including a header input including a plurality of light beams representing a set of header data corresponding to a data packet, a microlens array that collimates the plurality of light beams, a decoding mask that diffracts the plurality of collimated light beams based on a predesigned coding sequence, a photodetector array that detects the plurality of diffracted light beams, and a heteroassociative memory processing circuit that converts a given input pattern into a corresponding output pattern based on a desired mapping algorithm.

Yet another object of this invention is to provide a data mapping processor including a header input including a plurality of multiple channel electrical signals representing a set of header data corresponding to a data packet, a laser diode array that transforms the plurality of electrical signals into a plurality of light beams, a microlens array that collimates the plurality of light beams, a decoding mask that diffracts the plurality of collimated light beams based on a predesigned coding sequence, a photodetector array that detects the plurality of diffracted light beams, and a heteroassociative memory processing circuit that converts a given input pattern into a corresponding output pattern based on a desired mapping algorithm.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
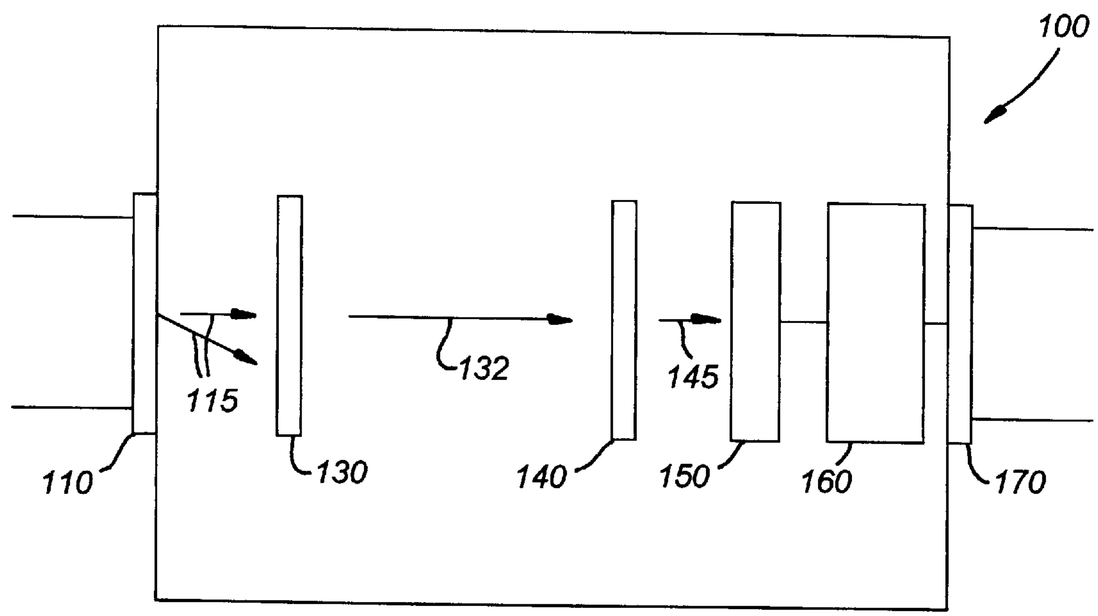
FIG. 1 is an exemplary block diagram of an optical associative memory processor according to one embodiment of the present invention wherein multiple light beams represent header data.

FIG. 1 is an exemplary block diagram of an optical associative memory processor 100 according to one embodiment of the present invention. Optical associative memory processor 100 is a data mapping processor including a heteroassociative memory that converts a given input pattern into a corresponding output pattern based on a desired mapping algorithm (e.g., a self-routing control algorithm in the preferred embodiment of the present invention). Optical associative memory processor 100 includes a header input 110, a microlens array 130, a decoding mask 140, a photodetector array 150, a processing circuit 160, and a control output 170. Decoding mask 140 includes optical elements that contain a recording of the routing algorithm of the ATM switch (e.g., passive holographic optical elements (HOEs) or diffractive optical elements (DOEs)).

Holographic Optical Associative Memory

In operation, multiple light beams 115 representing header data from a data packet (e.g., an ATM packet) are received from header input 110 and collimated by microlens array 130, resulting in multiple collimated beams 132. Decoding mask 140 in accordance with a predesigned coding sequence diffracts collimated beams 132. Diffracted light 145 is distributed to photodetector array 150 where predesigned control coding is generated by processing circuit 160 for self-routing control and output through control output 170.

Figure 2:
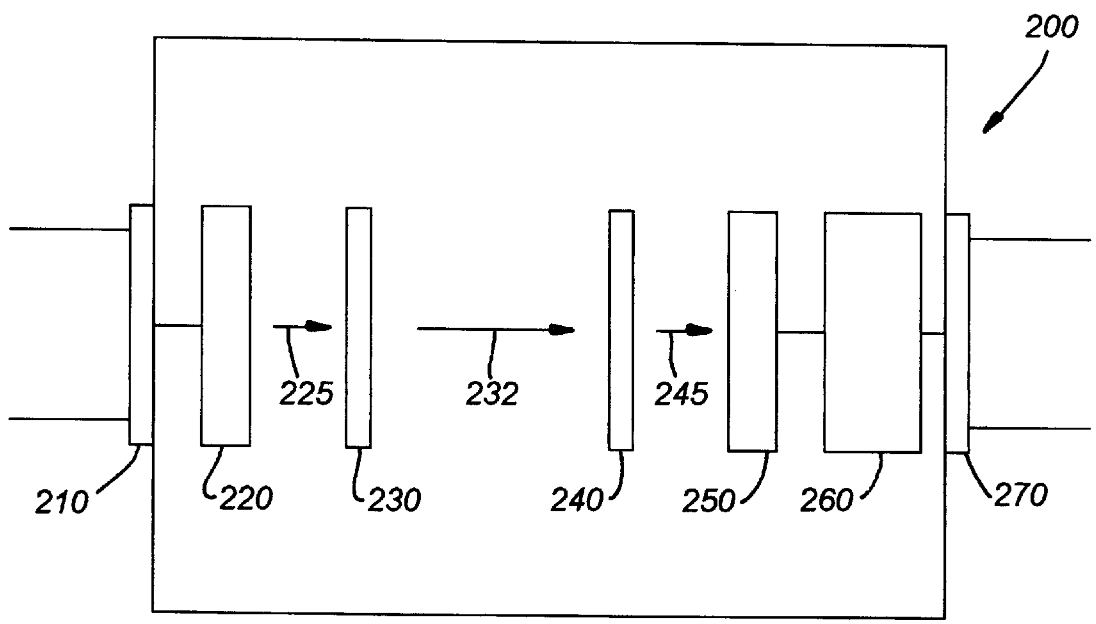
FIG. 2 is an exemplary block diagram of an optical associative memory processor according to another embodiment of the present invention wherein multiple channel electrical signals represent header data.

FIG. 2 is an exemplary block diagram of an optical associative memory processor 200 according to another embodiment of the present invention that further includes a VCSEL array 220. In particular, optical associative memory processor 200 includes a header input 210, VCSEL array and related circuitry 220, a microlens array 230, a decoder mask 240, a photodetector array 250, a processing circuit 260, and a control output 270.

In operation, multiple channel electrical signals representing header data are received from header input 210 and transformed by VCSEL array 220 into multiple light beams 225. Multiple light beams 225 are collimated by microlens array 230, resulting in multiple collimated beams 232. Decoding mask 240 in accordance with a predesigned coding sequence then diffracts collimated beams 232. Diffracted light 245 is distributed to photodetector array 250 where predesigned control coding is generated by processing circuit 260 for self-routing control and then output through control output 270.

Figure 3:
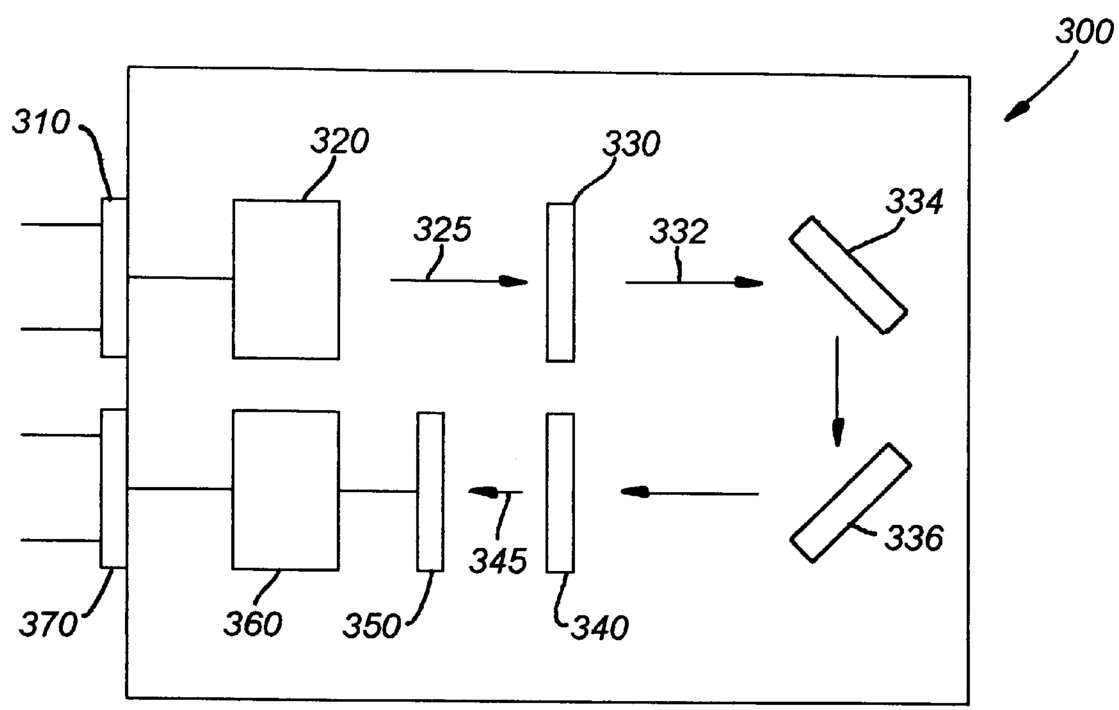
FIG. 3 is an exemplary block diagram of an optical associative memory processor according to another embodiment of the present invention wherein multiple channel electrical signals represent header data and collimated beams are directed by optical path folding mirrors.

FIG. 3 is an exemplary block diagram of an optical associative memory processor 300 according to yet another embodiment of the present invention. Optical associative memory processor 300 includes a header input 310, a VCSEL array 320, a microlens array 330, a pair of optical path folding mirrors 334 and 336, a decoding mask 340, a high-speed photodetector array 350, a processing circuit 360, and a control output 370.

In operation, multiple channel electrical signals representing header data are received from header input 310 and transformed by VCSEL array 320 into multiple light beams 325. Multiple light beams 325 are collimated by microlens array 330, resulting in multiple collimated beams 332. Collimated beams 332 are directed by optical path folding mirrors 334 and 336 to decoding mask 340. Decoding mask 340 then diffracts collimated beams 332 in accordance with a predesigned coding sequence. Diffracted light 345 is distributed to photodetector array 350 where predesigned control coding is generated by processing circuit 360 for self-routing control and then output through control output 370.

Figure 4:
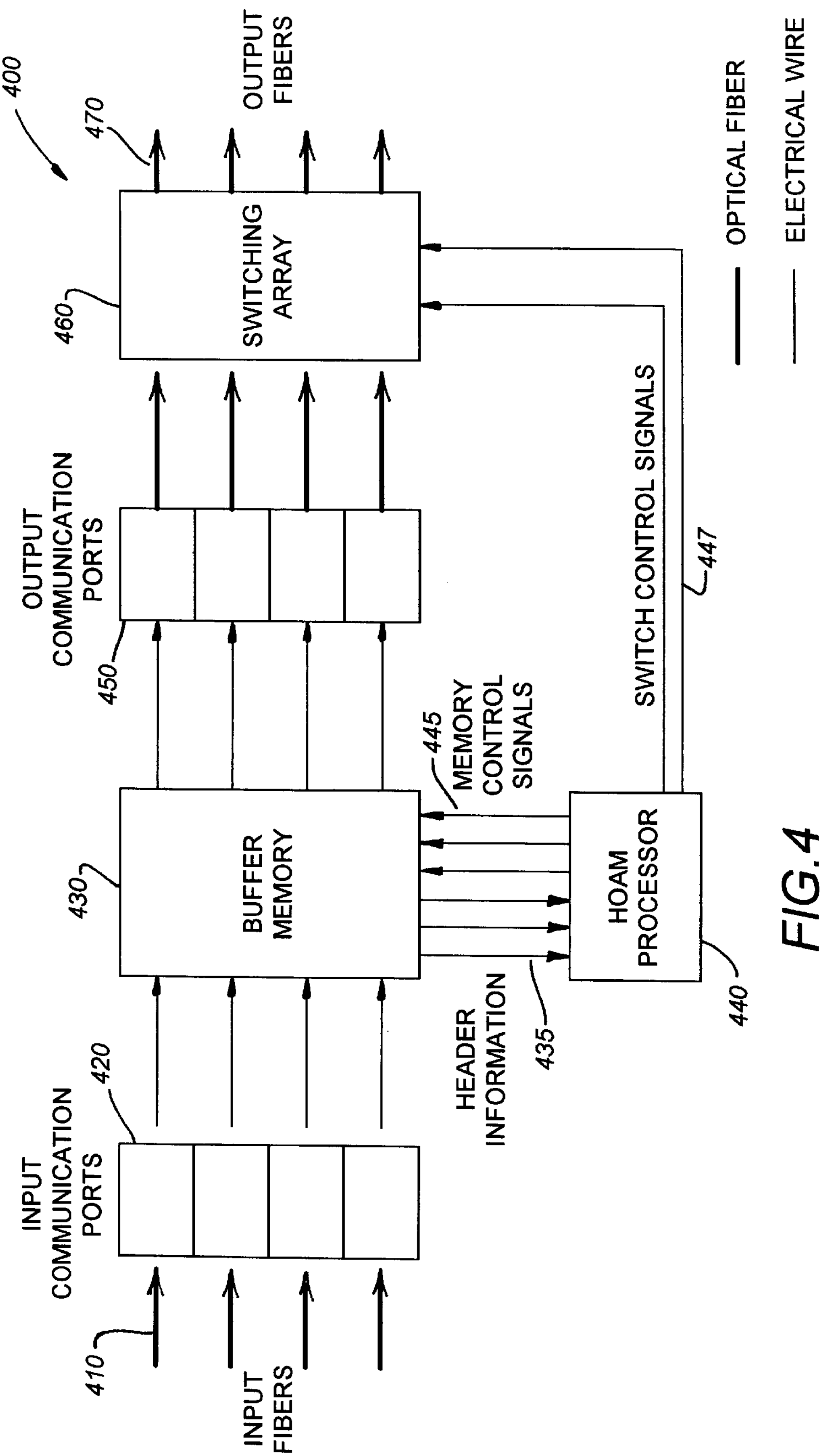
FIG. 4 is an exemplary block diagram of a self-routing switching node for an optically interconnected network that utilizes an optical associative memory processor according to one embodiment of the present invention.

FIG. 4 is an exemplary block diagram of a self-routing switching node 400 for an optically interconnected network according to the preferred embodiment of the present invention. Optical associative memory processor 440 includes processor 100, processor 200 including VSCEL array 220, or processor 300 including optical path folding mirrors 334, 336 as described in connection with FIGS. 1, 2 and 3, respectively.

In particular, switching node 400 includes input fibers 410, input communication ports 420, a buffer memory unit 430, optical associative memory processor 440, output communication ports 450, a switching array 460, and output fibers 470.

In operation, optical data packets are received from input fibers 410 and then converted into electrical data packets in the input communication ports 420 when entering switching node 400. A buffer memory unit 430 temporarily stores the incoming data packets for both synchronization and contention. A set of header bits 435 associated with each incoming data packet are copied from buffer memory unit 430 and delivered to optical associative memory processor 440 for routing decisions. Buffer memory unit 430 is overhead for switching node 400. In other words, the smaller the buffer memory size per channel, the higher the performance and the lower the complexity of the switching node 400.

Once optical associative memory processor 440 reaches its routing decision, a set of memory controls signals 445 is sent to buffer memory unit 430 to access the desired data packets in buffer memory unit 430. Some data packets may stay in buffer memory unit 430 due to switching contention. These memory control signals 445 also include the header information, which replaces the old header information for the given data packet.

The renewal of the header information allows the data packets to operate in a multiple hop network. The retrieved electrical data packets with new header information are converted to optical data packets in output communication ports 450, and transmitted to switching array 460. Another set of routing control signals from optical associative memory processor 440 is delivered to switching array 460 via switch control signal 447 for physical switching functions.

In the preferred embodiment of the present invention, switching array 460 is an electronic switch array. Alternatively, switching array 460 is an optoelectronic switch array that is located before output communication port 450. The incoming data is a high-speed bit-serial data stream (e.g., 10 Gb/s for OC-192) that is converted to a bit-parallel stream in optical associative memory processor 440 and/or buffer memory unit 430 that simplifies the overall switching node design.

The processing speed of optical associative memory processor 440 is faster than any current electronic processing techniques by at least one to two orders of magnitude. This increase in speed is realized by implementing parallel processing and a massively interconnected and global association capability in optical associative memory processor 440 that enables processor 440 to be particularly well-suited for ATM communication network applications.

As illustrated in FIGS. 1–3, optical associative memory processor 440 includes small arrays of laser diodes (FIGS. 2–3), photodetectors, and passive holographic optical elements (HOEs) or diffractive optical elements (DOEs). The holographic optical elements and diffractive optical elements contain a recording of the routing algorithm of the ATM switch. After the header bits from all of the input ATM cells are presented to the input of the optical associative memory processor 440 which is designed to implement an association memory operation, optical associative memory processor 440 immediately maps the header bits into a set of routing control signals in the photodetector array. Therefore, the processing time of this operation is only limited by the response time of the laser diodes and photodetectors (e.g., nanoseconds).

Due to the extremely short processing time of optical associative memory processor 440 for routing control signals, the required buffer memory size is minimal. In other words, a buffer with only a few data packets is needed. For example, when the data rate per channel is 10 Gb/s, the transmission time of a 53-byte data packet will be ~42 ns. If the processing time of optical associative memory processor 440 is 10 ns, switching node 400 only requires a buffer memory size of 53 bytes per channel. The small buffer memory size required by optical associative memory processor 440 increases the number of channels for self-routing switching node 400, thereby enabling self-routing switching node 440 to operate at a very high data rate (tens of Gb/s) per channel, with a large number of input and output channels.

Increasing the number of channels will not reduce the processing time of the optical associative memory processor 440, despite the concurrent increase in the number of laser diodes, holographic elements, and photodetectors in optical associative memory processor 440. In ATM cells, three bytes of the header are for addressing and the remaining two bytes are for network management and flow control. The three address bytes can accommodate a switching node with up to $2^{24}$ (or more than 16 million) input or output channels.

In the preferred embodiment of the present invention, in optical associative memory processor 440, each header bit represents a laser diode and a holographic array element. For example, if a switching node has 16 channels, each channel has 3 bytes, or 24 addressing bits (representing the Virtual Circuit Identifier (VCI) and Virtual Path Identifier (VPI)). Therefore, the number of laser diodes is 1000 (e.g., $k \times 16 \times 24$, where k is the scrambling/coding factor for the optical associative memory processor design—in this case k=2.6) and the number of holographic elements will be 1000, or less than $32 \times 32$ in a 2-D configuration.

With this small array size, the laser diode array and the photodetector array are addressed directly, thereby resulting in a response time on the part of optical associative memory processor 440 in the range of nanoseconds. In the case of a physical network, every header bit is used so that the three byte address header in the ATM cell does not have any additional space to accommodate a large network. Therefore, only a small subset of the header bits can be used so that the total number of laser diodes, detectors, and optical elements are reduced.

The scrambling/coding factor (k) for optical associative memory processor 440 ensures robustness and reliability in operation as the additional data space (due to the scrambling/coding) makes the mapping boundary between adjacent classifications separated enough for highly reliable, redundant, and error-free operation. To further increase the reliability of optical associative memory processor 440 based on the self-routing operation, processor 440 includes multiple levels of redundancy.

In the present invention, redundant VCSELs, optical elements and photodetector array elements are included in optical associative memory processor 440. Alternatively, a separate but complete back-up optical associative memory processor is included in the same optoelectronic packaging as optical associative memory processor 440.

To address the problem of adding or deleting the end-user nodes in the network, optical associative memory processor 440 uses a scalable design approach. For example, an optical associative memory processor with 16 channels is capable of handling a switching node by requiring only 8 channels. When additional user nodes are added and when the switching node requires, for example, 10 channels, the original optical associative memory processor 440 (originally configured for 16 channels) is still used. Therefore, optical associative memory processor 440 does not need to be changed when adding or deleting end-user nodes.

Optical associative memory processor 440 is updated when the network topology is completely changed. This, however, does not occur frequently since changing the network topology means designing an entirely new network, including routing table/algorithms, assigning user addresses, network management, etc. A change in the network's topology typically occurs only once every year or so to incorporate new business critical features into the existing network.

Buffer memory 430 consists of shift registers and latch arrays. Shift registers are used to temporarily store the incoming ATM cells and wait for the routing decision from optical associative memory processor 440 to ensure that no cells are lost during the data processing time period. Because an incoming data packet in each channel may arrive at a different time step, synchronization in switching node 400 determines the routing control signal. In the preferred embodiment of the present invention, when two or more data packets have the same forwarding address, the packet with the higher priority is transmitted first, while the rest of packets are temporarily stored in buffer memory 430.

Buffer memory 430 includes latch arrays, such as a logic circuit and latch array (LCLA) and a header bit update logic (HBUL). The LCLA logic circuit and latch array extract the header bits of each ATM cell to optical associative memory processor 440. After optical associative memory processor 440 generates the routing or switching control signals to switching array 460, it also updates the header bits as memory control signals 445. Memory control signals 445 are transmitted back to buffer memory 430 by the HBUL circuit. The clock information is transmitted to buffer memory 430 from each receiver to control the operating frequency of the flip-flops (shift-registers) and latches.

Figure 5:
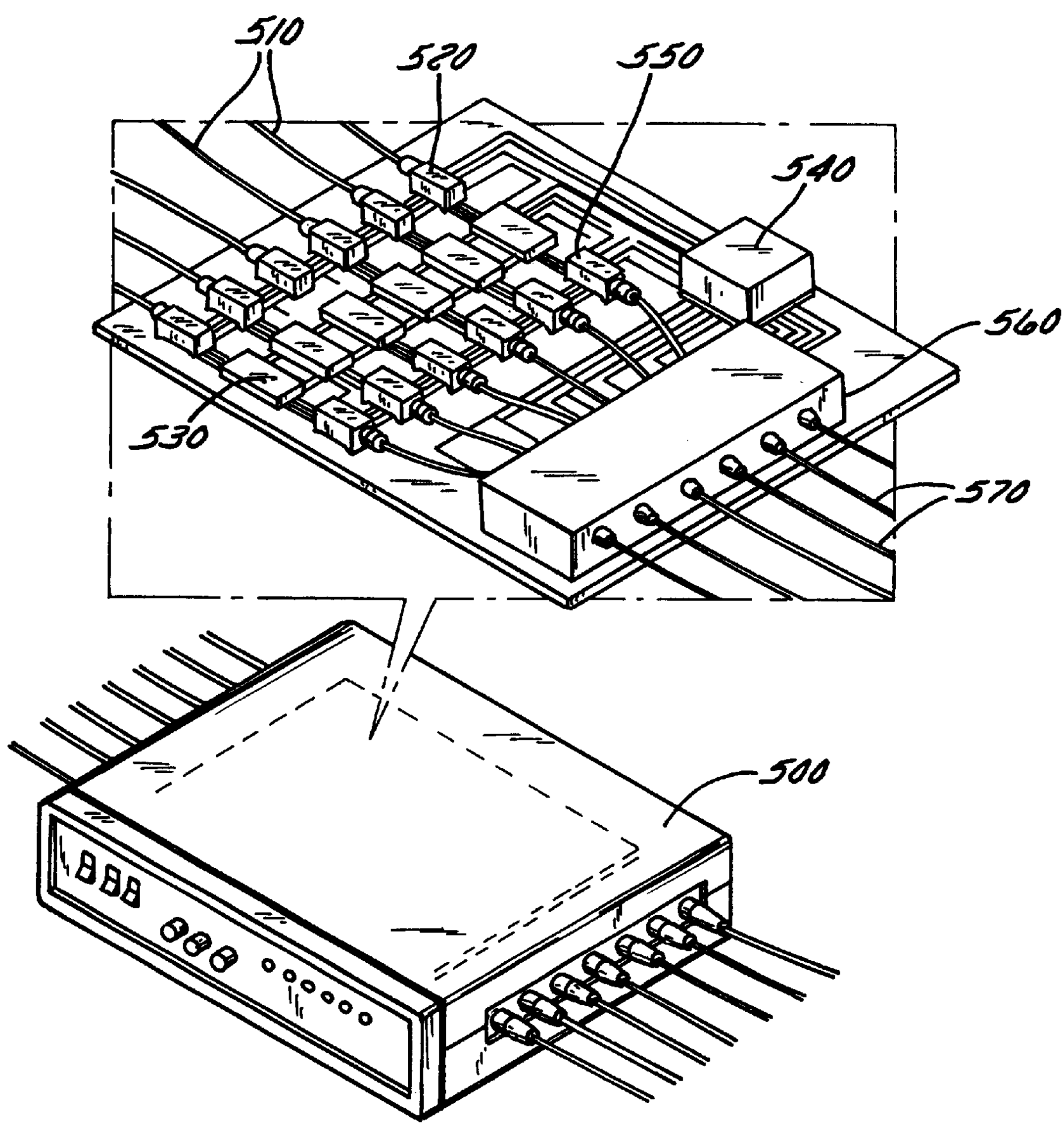
FIG. 5 is a block diagram of a self-routing switching node for an optically interconnected network according to another embodiment of the present invention.

FIG. 5 is a block diagram of a self-routing switching node 500 for an optically interconnected network according to another embodiment of the present invention. Switching node 500 includes input fibers 510, input communication ports 520, buffer memory 530, an optical associative memory processor 540, output communication ports 550, a switching array 560, and output fibers 570. In operation, elements of self-routing switching node 500 operate in a similar manner to elements of self-routing switching node 400.

Figure 6:
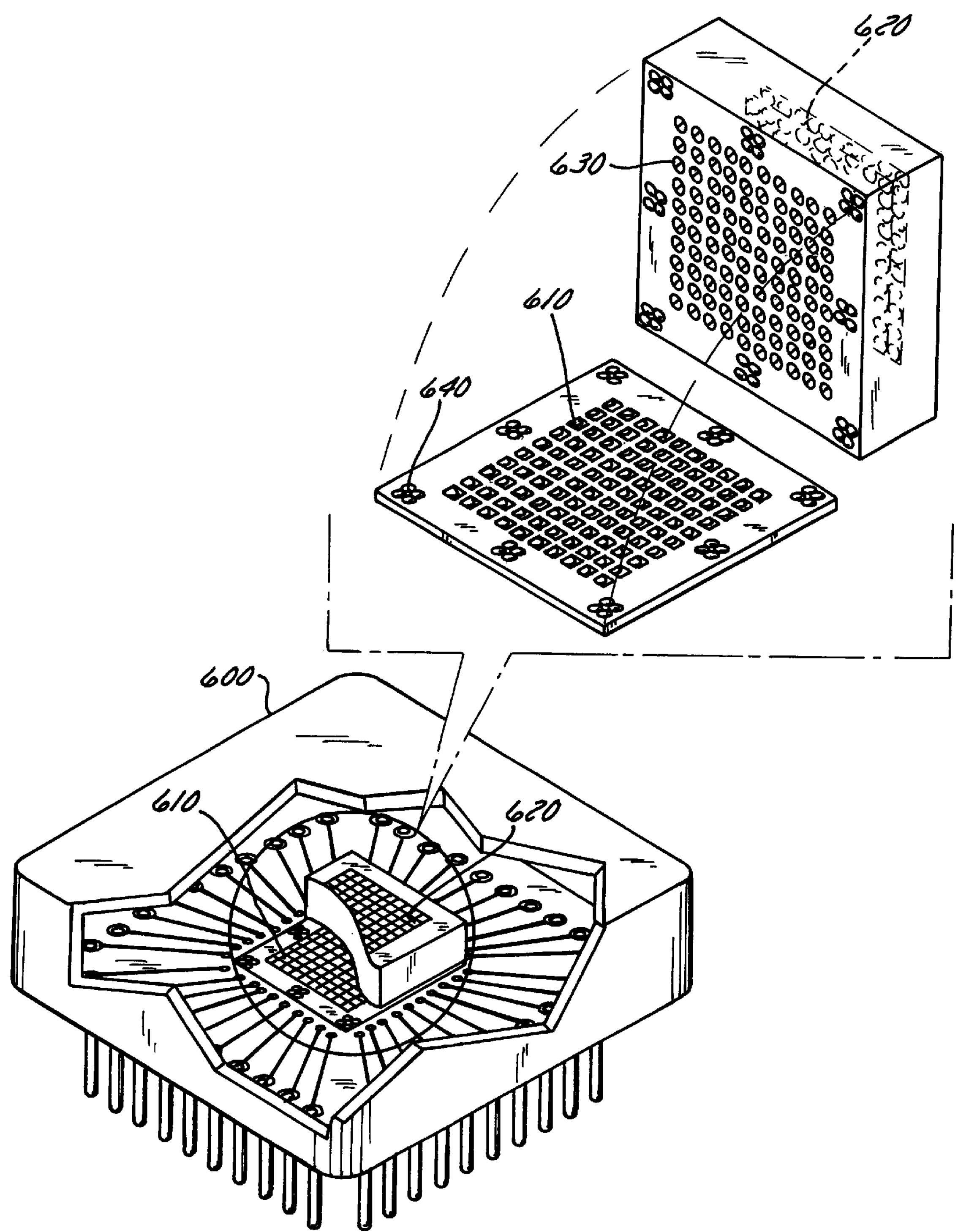
FIG. 6 is a block diagram of an optical associative memory processor chip in a packaging configuration according to the present invention.

FIG. 6 is an exemplary illustration of an optical associative memory processor chip 600 in a packaging configuration. Optical associative memory processor chip 600 includes a smart pixel array 610, a HOE/DOE array 620, an integrated lens array 630, and indium solder bumps 640. Optical associative memory processor chip 600 is fabricated in a compact optoelectronic chip configuration. Smart pixel array 610 includes VCSELs, photodetectors, and pre- and post-processing electronics. In the packaging, optoelectronic element arrays of smart pixel array 610 (e.g., the VCSELs and photodetectors) are made either monolithically or packaged through a flip-chip bonding process. The same flip-chip bonding technique is also used to package optical associative memory chip 600 with the optoelectronic chip. The packaging of optical associative memory processor chip 600 is <1×1×0.5 inch$^3$. Therefore, as compared to automatic target recognition, neural networks, holographic memory, and optical pattern recognition, optical associative memory processor chip 600 does not require a large array size (e.g., >256×256) and a programmable (or rewritable holographic pattern) operation.

Digital Optical Associative Memory

Figure 7:
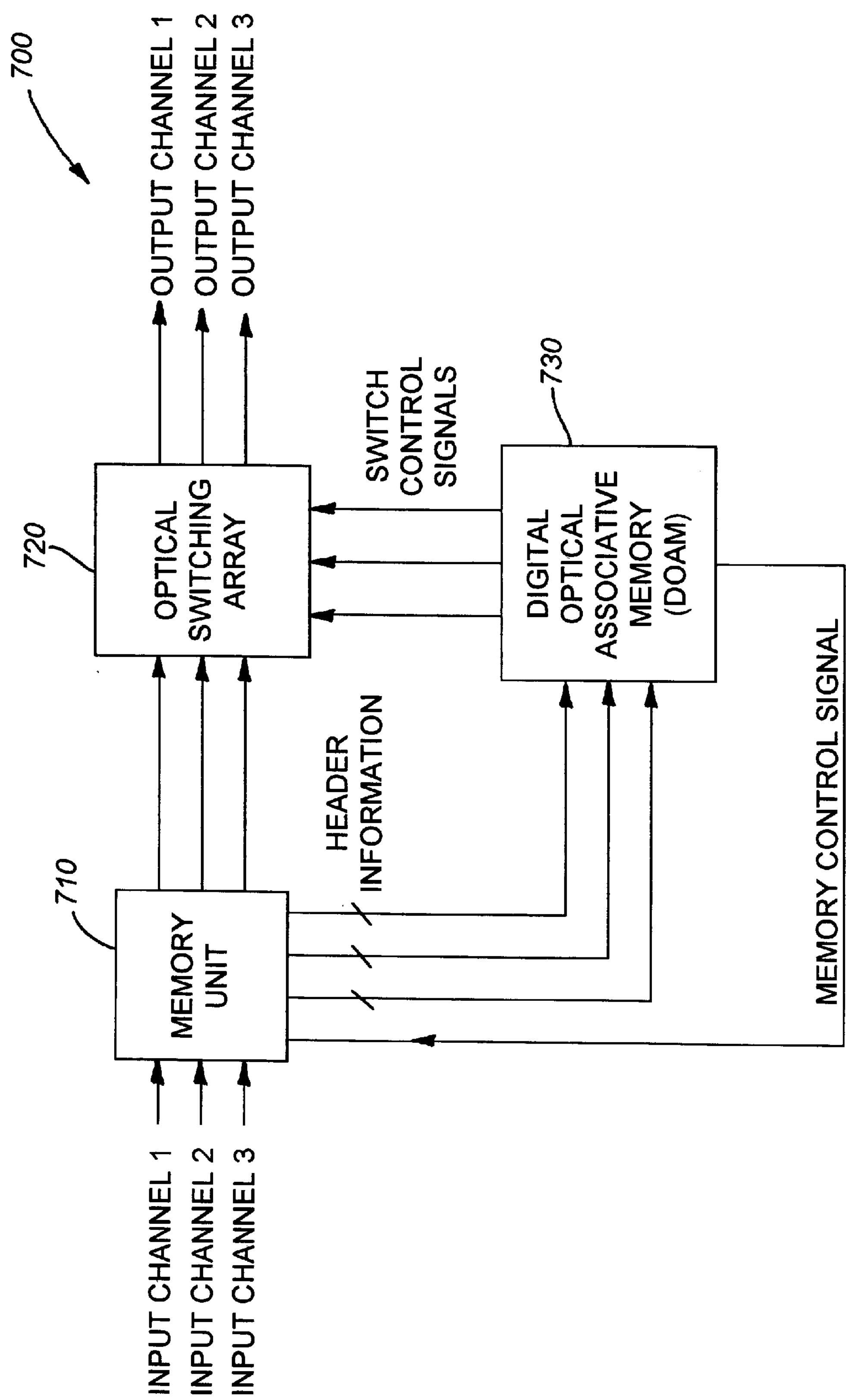
FIG. 7 is an exemplary illustration of a self-routing node according to one embodiment of the present invention.

FIG. 7 is an exemplary illustration of a self-routing node 700 according to another embodiment of the present invention. Self-routing node 700 illustrates a digital optical associative memory processor 730, together with a memory unit 710 for temporary storage and synchronization, and an optical switch array 720 for physical channel routing. In this regard, memory unit 710, optical switching array 720, and digital optical associative memory processor 730 operate in a similar manner to buffer memory 430, switching array 460, and optical associative memory processor 440, respectively, of FIG. 4.

In operation, input data streams are first stored in memory unit 710 for synchronization and temporary storage. Header bits are tapped out and converted into parallel spatial bits. These parallel header bits enter digital optical associative memory processor 730 from which node switching and contention solutions are determined and sent to optical switching array 720. In other words, digital optical associative memory processor 730 sends out a switching array for routing and, at the same time, delivers memory control signals to memory unit 710. Memory unit 710, in turn, controls the read-out of the memory (e.g., in the preferred embodiment of the present invention, some of the input data streams are forwarded to the optical switching array for routing, and some of them stay in memory because of switching contention or for other reasons).

The global association capability of digital optical associative memory processor 730 determines switch control signals and memory control signals based on the header bits from the input data streams. Digital optical associative memory processor 730 processes contention problems and multi-stage routing. The header bit stream consists of starting address bits, destination address bits, priority bits (for determining the routing priority, thereby solving the contention problem), status bits (for multi-header bits for the decision-making process), and/or other necessary information. Digital optical associative memory processor 730 makes a routing decision based on this information from all the input channels, which is significantly different than conventional self-routing techniques such as TDM, WDM, and CDM. In this regard, the conventional self-routing techniques determine routing on the basis of information from individual input channels and do not fuse pieces of individual information together. Conventional self-routing techniques, therefore, cannot handle switching contention problems and multi-stage routing.

As discussed above, digital optical associative memory processor 730 and the associated switch components provide a solution to node contention, multi-stage routing, and synchronization problems. Therefore, the self-routing operation in a network node implementing digital optical associative memory processor 730 is complete and offers design flexibility and overall improvement in throughput. In an alternative embodiment of the present invention, the TDM, WDM, or CDM techniques are implemented with digital optical associative memory processor 730 to further enhance the performance of the self-routing node 700.

Figure 8:
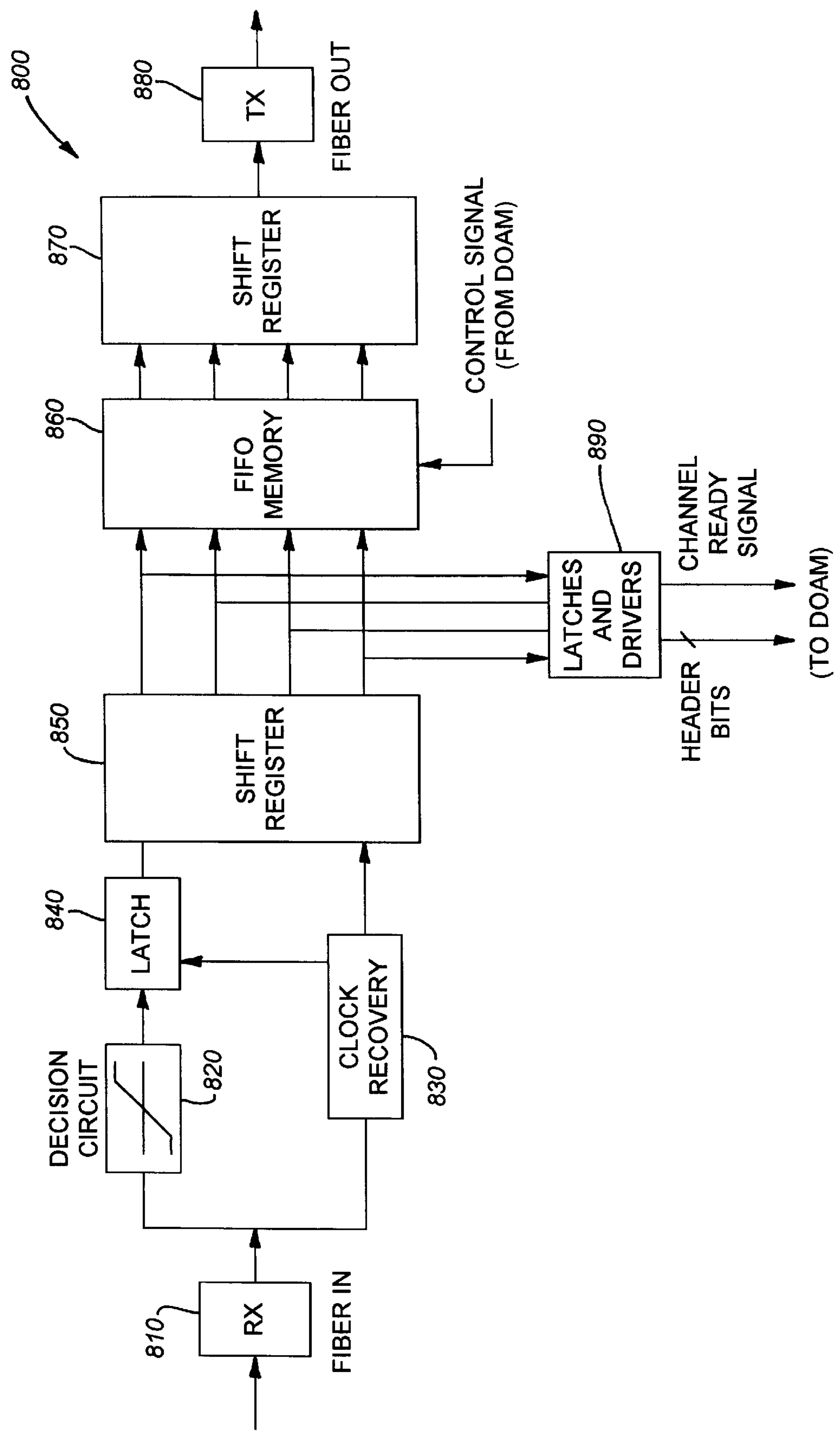
FIG. 8 is an exemplary block diagram of a memory unit according to the present invention.

FIG. 8 is an exemplary block diagram of a memory unit 800 corresponding to memory unit 710 of FIG. 7 with only one input/output channel. Memory unit 800 temporarily stores and synchronizes a data packet and later regenerates and transmits the data packet to an output fiber. Memory unit 800 includes an optoelectronic receiver 810, a decision circuit 820, a clock recovery circuit 830, a latch 840, a shift register 850, a FIFO memory 860, a shift register 870, an optoelectronic transmitter 880, and latches and drivers 890.

In operation, an optoelectronic receiver (RX) 810 at the input of the unit converts the optical signal to an electrical signal. After amplification to the proper level, the electrical signal is fed to a clock recovery circuit 830 and to a decision circuit 820. The decision circuit 820 functions like a comparator and translates the signal to the proper logic level at the output. Clock recovery circuit 830 extracts the clock signal from the data and synchronizes and retimes the data by controlling a latch 840 that holds the data temporarily. The signal bits are moved to a shift register 850 in which serial-to-parallel conversion occurs. When the entire header is recovered, it is stored in an array of output latches and drivers 890. At the same time, a ready signal is produced to notify the digital optical associative memory processor 730 that the header is ready for routing determination.

After serial-to-parallel conversion, the header bits and data bits of a data packet are saved in a first-in, first-out (FIFO) memory 860. When all the channels are ready, digital optical associative memory processor 730 is activated to determine the routing of the incoming data packets. When digital optical associative memory processor 730 completes its operation, it produces a control signal to trigger memory unit 800 to output the data packet stored in FIFO memory 860. The data packet is read from FIFO 860 and converted to serial data form using a shift register 870. An optoelectronic transmitter (TX) 880 is used to regenerate the optical signal, allowing the cascading of switching nodes.

Memory unit 800 and optoelectronic transceivers 810 and 880 have large memories with adequate speed in a small package with data regeneration as opposed to a fiber delay line memory with kilometer-long fiber coil and a fiber coupler with attenuation or power loss.

Digital optical associative memory processor 730 processes all of the available input header bits (including source address bits, destination address bits, priority bits, status bits, and others from all the input channels) and maps these bits into a set of output data (including switch control signals and memory control signals) for self-routing control. Therefore, digital optical associative memory processor 730 is a data mapping processor or a heteroassociative memory that converts a given input pattern into a corresponding output pattern based on a desired mapping algorithm which, in the preferred embodiment of the present invention, is a self-routing control algorithm.

Figure 9:
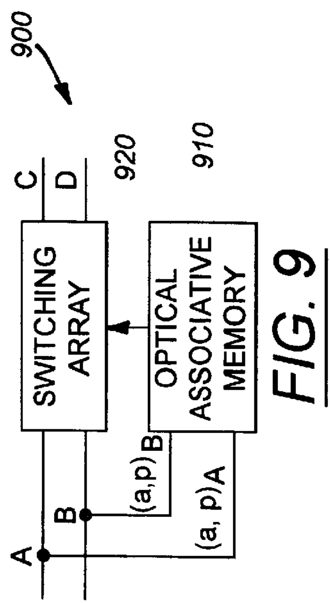
FIG. 9 is an exemplary illustration of a system showing the operation of a digital optical associative memory processor with a switching array according to the present invention.

FIG. 9 is an exemplary illustration of a system 900 showing the operation of a digital optical associative memory processor 910 with a switching array 920. System 900 includes input channels A and B, output channels C and D, digital optical associative memory processor 910, and a switching array 920. System 900 uses two header bits: one for address bits (a), the other for priority bits (p). If a=0, it refers to straight-through switching; if a=1, it refers to cross-over switching. If p=2, the corresponding input channel has priority to be switched first. If the priority bits from both input channels are identical, channel A has priority.

As illustrated below in TABLE 1 that shows the routing operations for all of the possible cases, digital optical associative memory processor 910 maps sixteen possible cases into six possible switching statuses (e.g., $S_0, S_1, \ldots, S_5$). There can be several physical address or priority bits representing an address bit or a priority bit in the design of digital optical associative memory processor 910.

For example, three physical bits $(b_2, b_1, b_0)=(0, 1, 1)$ and $(b_2, b_1, b_0)=(1, 0, 0)$ can represent bits 0 and 1, respectively, in the design of digital optical associative memory processor 910. This bit expansion creates a spacious storage area for associative memory, since a given input data set may be mapped to a particular output data set in one step, without being confused by a similar input data set (e.g., there may be only a one-bit difference in the two input data sets). In the example given above where $(b_2, b_1, b_0)=(0, 1, 1)$ and $(b_2, b_1, b_0)=(1, 0, 0)$, there is at least a three-bit difference in the physical implementation, even with only a one-bit difference in the design process.

TABLE 1

| | Input Channels | | | | | |
|---|---|---|---|---|---|---|
| | A | | B | | | Switching |
| Case | a | p | a | p | Switching Condition | Status |
| 1 | 0 | 0 | 0 | 0 | A→C, B→D | $S_0$ |
| 2 | 0 | 0 | 0 | 1 | A→C, B→D | $S_0$ |
| 3 | 0 | 0 | 1 | 0 | A→C (first), B→C (next) | $S_1$ |
| 4 | 0 | 0 | 1 | 1 | B→C (first), A→C (next) | $S_2$ |
| 5 | 0 | 1 | 0 | 0 | A→C, B→D | $S_0$ |
| 6 | 0 | 1 | 0 | 1 | A→C, B→D | $S_0$ |
| 7 | 0 | 1 | 1 | 0 | A→C (first), B→D (next) | $S_1$ |
| 8 | 0 | 1 | 1 | 1 | A→C (first), B→D (next) | $S_1$ |
| 9 | 1 | 0 | 0 | 0 | A→D (first), B→D (next) | $S_3$ |
| 10 | 1 | 0 | 0 | 1 | B→D (first), A→D (next) | $S_4$ |
| 11 | 1 | 0 | 1 | 0 | A→D, B→C | $S_5$ |
| 12 | 1 | 0 | 1 | 1 | A→D, B→C | $S_5$ |
| 13 | 1 | 1 | 0 | 0 | A→D (first), B→D (next) | $S_3$ |
| 14 | 1 | 1 | 0 | 1 | A→D (first), B→D (next) | $S_3$ |
| 15 | 1 | 1 | 1 | 0 | A→D, B→C | $S_5$ |
| 16 | 1 | 1 | 1 | 1 | A→D, B→C | S5 |

Light Imaging Quasi-Orthogonal Switching Module ("LIQO")

Figure 10:
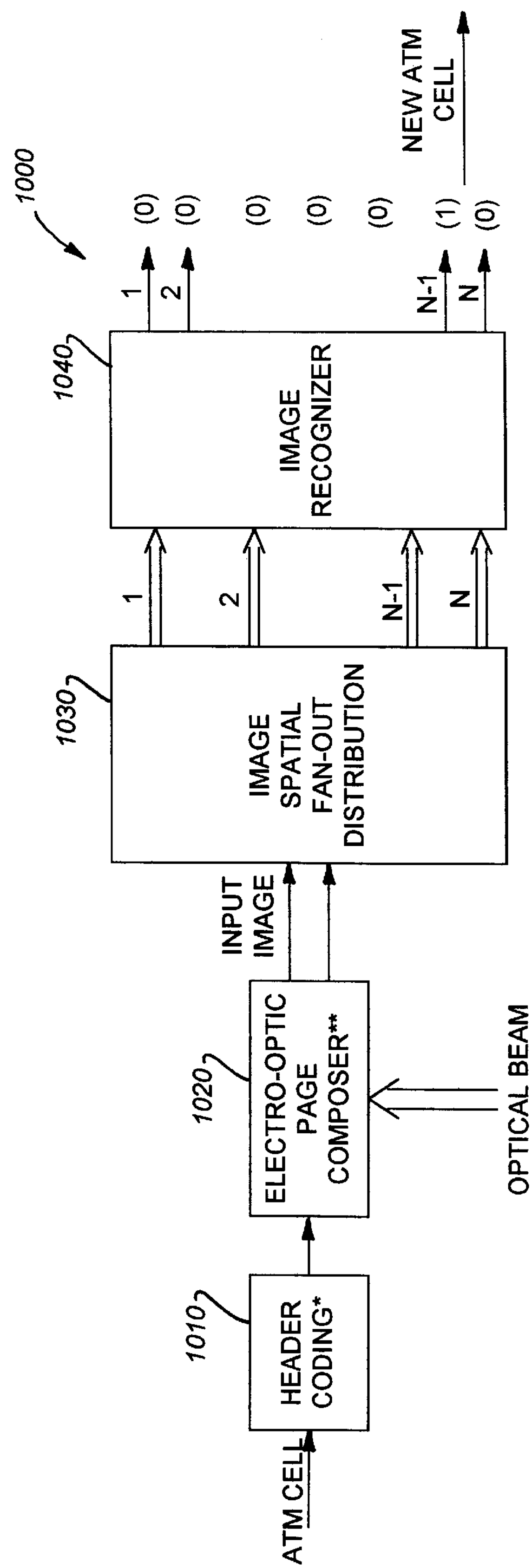
FIG. 10 is an exemplary illustration of a switch node according to another embodiment of the present invention.

FIG. 10 is an exemplary illustration of a switch node 1000 according to another embodiment of the present invention. Switch node 1000 is a light imaging quasi-orthogonal (LIQO) switching module that relies on the inherent parallel distribution capability of optical imaging (either in a coherent or a noncoherent manner) to fan-out and distribute ATM header codes and then perform self-routing through special look-up-table decoding.

In the preferred embodiment of the present invention, switch node 1000 includes a header coding module 1010, an electro-optic page composer module 1020, an image spatial fan-out distribution module 1030 and an image recognizing module 1040. Node 1000 realizes the required fast ATM self-routing in one clock time period (ns).

In operation, the ATM header coding is first transformed from an electrical signal into a optical signal by a VCSEL array in distribution module 1030. A microlens array fan-out distributor in the distribution module 1030 then distributes the optical header coding to image recognizer 1040. Finally, at image recognizer 1040, the transmitted data is self-routed to the particular assigned channel.

For example, in an ATM header [1,0, . . . ,0,1, 1,0]., the Address Header (AH) is a part of the ATM switch header and has N binary components with M bits on one status. For example, in [1,0, . . . ,0,1, 1,0], N=5, and M=4.

For clock applications, consider only balanced bits:

$$N \equiv 2M \tag{1}$$

where "≡" means "close" to "or substantially equal to". For purposes of this analysis, consider for simplicity that:

$$N=2M \tag{2}$$

AH is defined as a vector:

$$|\vartheta_i\rangle = \frac{1}{\sqrt{M}}[x_1^{(i)}, x_2^{(i)} X_k^{(i)}, x_{N-1}^{(i)}, x,_N^{(i)}] \tag{3}$$

Assuming Eq.(2), the scalar product of the AHs vector is:

$$\langle a_i \mid a_j \rangle = \frac{1}{M}(M-K), \tag{4}$$

where $$K=0,1, \ldots, M-1, M; \tag{5}$$

For example:

$$\langle a_i \mid a_i \rangle = \begin{cases} \frac{1}{M} M, \text{ or} & (6a) \\ \frac{1}{M}(M-1), \text{ or}) & (6b) \\ \frac{1}{M}[M-(M-1)] = \frac{1}{M}, \text{ or} & (6c) \\ 0 & (6d) \end{cases}$$

The AH-threshold, or T, is the arithmetic average of (6a) and (6b), or:

$$T_M = \frac{1+\frac{1}{M}(M-1)}{2} = \frac{1+1-\frac{1}{M}}{2} = 1-\frac{1}{2M}, \text{ or} \tag{7}$$

$$T_M = 1-\frac{1}{N}. \tag{7a}$$

The quasi-orthogonal delta, or $\eta_{ij}$, is defined in the form:

$$\langle a_i \mid a_j \rangle = \begin{cases} 1, \text{ for } i=j \\ \text{"0", for } i \neq j. \end{cases} \tag{8}$$

In this case, "0" is the quasi-orthogonal symbol if:

$$<a_i|a_j>T_M. \tag{9}$$

Therefore, the basic expression of light imaging quasi-orthogonal algebra is:

$$<a_i|a_j=\eta_{ij}. \tag{10}$$

It is also:

$$<a_i|a_j>=<a_j|a_i>, \tag{10a}$$

which is a quasi-orthogonal relationship.

A. EXAMPLE OF A BALANCED CASE

Consider: N=4; M=N/2=2. The number, W, of the quasi-orthogonal AH-vector is:

$$W_N = \frac{N!}{M!M!}, \tag{11}$$

in general, and:

$$W_4 = \frac{4!}{2!2!} = 6, \tag{12}$$

for this example.

The AH-vectors are:

$$|a_1\rangle = \frac{1}{\sqrt{2}}[1, 1, 0, 0] = \frac{1}{\sqrt{2}}[1100], \tag{13a}$$

$$|a_2\rangle = \frac{1}{\sqrt{2}}[1010], \tag{13b}$$

$$|a_3\rangle = \frac{1}{\sqrt{2}}[1001], \tag{13c}$$

$$|a_4\rangle = \frac{1}{\sqrt{2}}[0110], \tag{13d}$$

$$|a_5\rangle = \frac{1}{\sqrt{2}}[0101], \quad \text{and} \tag{13e}$$

$$|a_6\rangle = \frac{1}{\sqrt{2}}[0011]. \tag{13f}$$

The AH-threshold is, according to Eq. (7):

$$T_2 = 1 - \frac{1}{2\times 2} = 0.75. \tag{14}$$

The results are illustrated below in Table 2.

TABLE 2

EXAMPLES OF ALL THRESHOLDS

| | $|a_1\rangle$ | $|a_2\rangle$ | $|a_3\rangle$ | $|a_4\rangle$ | $|a_5\rangle$ | $|a_6\rangle$ |
|---|---|---|---|---|---|---|
| $|a_1\rangle$ | 1 | 0.5 | 0.5 | 0.5 | 0.5 | 0 |
| $|a_2\rangle$ | 0.5 | 1 | 0.5 | 0.5 | 0 | 0.5 |
| $|a_3\rangle$ | 0.5 | 0.5 | 1 | 0 | 0.5 | 0.5 |
| $|a_4\rangle$ | 0.5 | 0.5 | 0 | 1 | 0.5 | 0.5 |
| $|a_5\rangle$ | 0.5 | 0 | 0.5 | 0.5 | 1 | 0.5 |
| $|a_6\rangle$ | 0 | 0.5 | 0.5 | 0.5 | 0.5 | 1 |

To calculate these values in Table 2, consider:

$$\langle a_3 \mid a_2\rangle = \langle a_2 \mid a_3\rangle = \frac{1}{\sqrt{2}}[1010]\times\frac{1}{\sqrt{2}}\begin{bmatrix}1\\0\\0\\1\end{bmatrix} = \frac{1}{2}(1+0+0+0) = 0.5. \tag{15}$$

Truly Orthogonal Sets are constructed when the balancing condition (1) does not need to be satisfied.

B. EXAMPLE OF AN UNBALANCED CASE

Assuming M=1, and from Eq. (11) the number of AH vectors is exactly equal to N and all are orthogonal:

$$<a_i|a_j>=\delta_{ij}. \tag{16}$$

For N=4:

$$|a_1>=[1000], \tag{17a}$$

$$|a_2>=[0100], \tag{17b}$$

$$|a_3>=[0010], \tag{17c}$$

and $$|a_4>=[0001], \tag{17d}$$

and Table 3 below is all 1s and 0s.

TABLE 3

EXAMPLES OF AH VECTORS WITH N = 4 AND M = 1

| | $|a_1>$ | $|a_2>$ | $|a_3>$ | $|a_4>$ |
|---|---|---|---|---|
| $|a_1>$ | 1 | 0 | 0 | 0 |
| $|a_2>$ | 0 | 1 | 0 | 0 |
| $|a_3>$ | 0 | 0 | 1 | 0 |
| $|a_4>$ | 0 | 0 | 0 | 1 |

From Eq. (11) for N=2M, the number of addresses is W=N!/M!M!, as in Table 4 below.

TABLE 4

NUMBER OF AH ADDRESSES AND POWER BUDGET CONTRAINTS

| EXAMPLE (AH) | N | M | $W_N$ | $\sim\sqrt{W_N}$ | Fan-Out Loss |
|---|---|---|---|---|---|
| [0011] 1-D | 4 | 2 | 6 | 3 | Linear 8 dB |
| [010110] 2-D | 6 | 3 | 20 | 5 | 2-D 13 dB |
| [01011100] 2-D | 8 | 4 | 70 | 9 | 2-D 19 dB |
| [0101011100] 2-D | 10 | 5 | 252 | 16 | 2-D 24 dB |
| [011110011000] 2-D | 12 | 6 | 924 | 31 | 2-D 19 dB |

The fan-out loss is defined as:

$$L_{WN}=10 \log W_N. \tag{18}$$

C. EXAMPLE OF THE POWER BUDGET

In N=2M, N=8, M=4, and $W_N$=70, then:

$$L_{WN}=10 \log 70\cong 19 \text{ dB}.$$

Assuming VCSEL power is 5 mW (7 dBm) and a photodetector sensitivity is −35 dBm, then the total power budget (TPB)=7 dB+35 dB=42 dB, and the power margin for other losses, PM, is:

$$PM=42 \text{ dB}-10 \log W_M. \tag{19}$$

For $W_N$=70:

$$PM=42 \text{ dB}-19 \text{ dB}=23 \text{ dB}$$

For $W_N$=924:

$$PM-12 \text{ dB}$$

Figure 11:
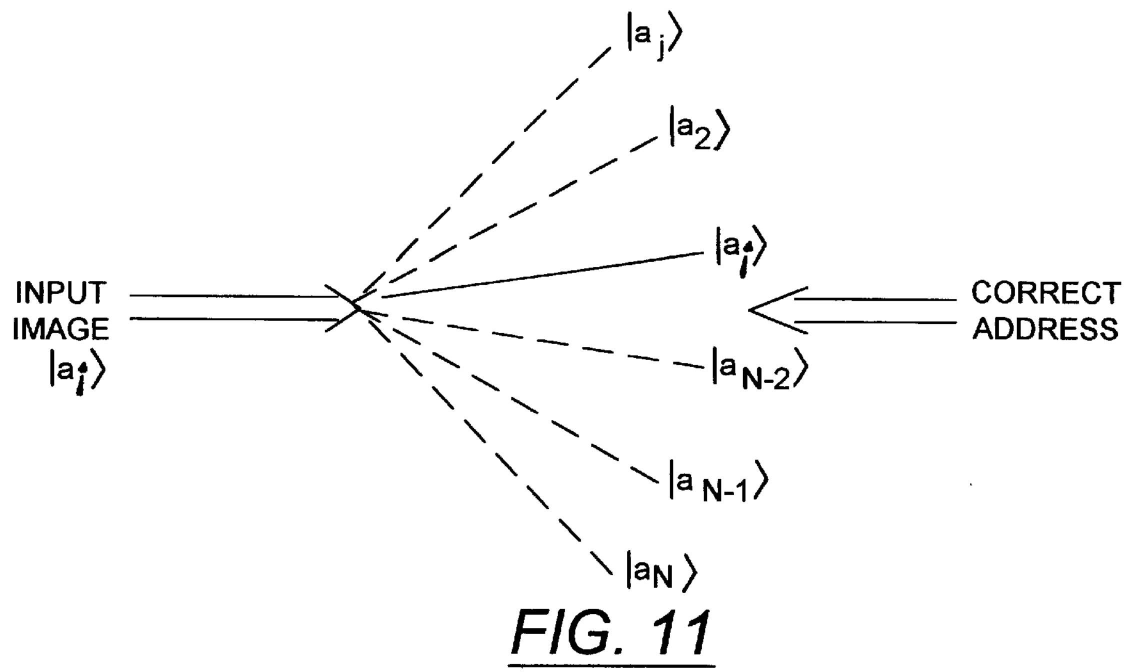
FIG. 11 is a diagram illustrating the fan-out operation of an optical switch according to the present invention.

The operational steps of light imaging switching include:

1. Display 1-D or 2-D VCSEL array;
2. Produce AH (e.g., in [1, 0, 0, 1]: “1” means “on”, and “0” means “off”);
3. VCSEL’s number is N. The number of VCSEL-on is M. For balance purposes, N=2M;
4. The number of addresses is $W_N$;
5. Produce a lens array with a $W_N$ number of lenses (1-D or 2-D);

6. Produce $W_N$-number of masks;
7. Calculate the threshold, $T_N$, for $W_N$ number of AH-vectors (Table 4); and
8. Whenever $<a_i|a_j>>T_N$, the correct address is found as illustrated in FIG. 11.

Figure 12:
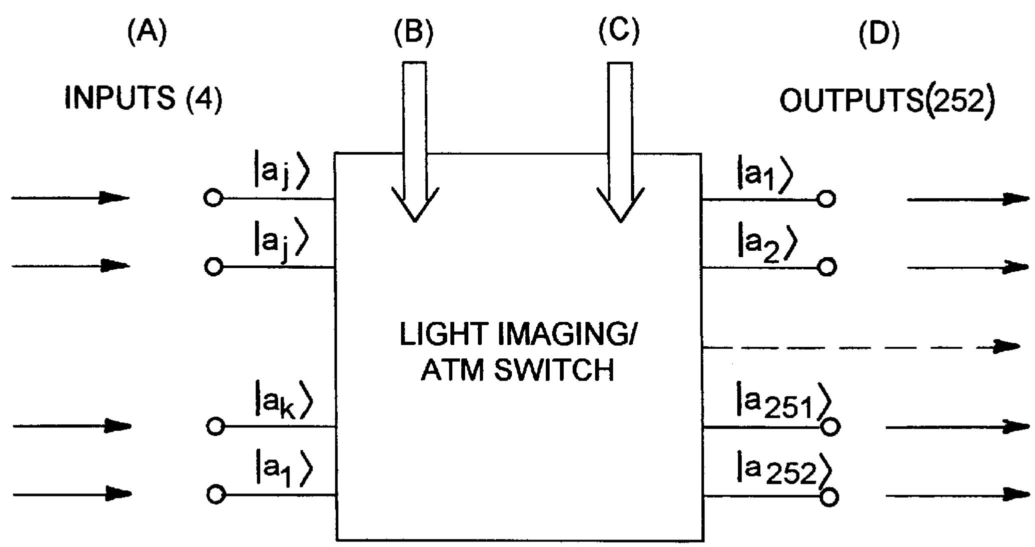
FIG. 12 is a block diagram of a light imaging switch according to the present invention.

Additionally, general relationships for both more and fewer correct addresses are also analyzed. For example, in the case of N=10, M=5, then with $W_N$=252, the power margin is still high: 18 dB. Consider a light imaging/ATM switch with four inputs and 252 outputs or addresses. The maximum number of different AHs is 252. In order to generate 252 different 10-bit balanced bit streams, such as [0011100110], the number of VCSELs is 10, and the lenslet array is approximately quadratic, less than 16×16 as illustrated in FIG. 12. From Eq. (7), the threshold value is:

$$T_{10}=1-1/10=0.9.$$

Therefore, the four basic operational steps described above include:

A. Pre-Light imaging operation (electronic)~10 nsec.

B. Light imaging input fan-in (electronic)~2 nsec.

C. Light imaging operation (optical)~2 nsec.

D. Post-operation (electronic)~10 nsec.

In particular, operation A is parallel but electronic, and operation B provides fan-in for one of the input channels to pass through optical fan-out, C. The correct address (one of 252) is identified both optically and in a parallel manner. Operation D is purely electronic.

The VCSEL transmitter chip is small, compact, and rugged enough to form the required integrated version. The VCSEL chip is also highly efficient and low in power consumption in order to provide high-speed, high-efficiency data transmission. In the preferred embodiment of the present invention, BeO is the substrate material in the VCSEL in distribution module 1030 for optimal impact on performance and for its dispersive effect. To further enhance thermal transfer, the BeO substrate is attached to a Kovar package, and the package is then attached to the outside wall of the dewar. The low thermal expansion characteristic BeO provides a stable platform to attach to the VCSEL array and hold the pigtail array in place.

Multiple signals (e.g., eight) are connected to the eight bonding pads on the left side of the substrate. A common loading resistor is connected to two bonding pads at the upper left corner. The input signals are subsequently enhanced through a low power CMOS buffer chip that provides sufficient isolation between the data input and the VCSEL array chips. Next, eight surface mount resistors are attached between the CMOS buffer and the VCSEL array. The chip resistors (1) provide the optimum bias for each VCSEL unit, and (2) provide the current limit for the entire VCSEL array transmitter subsystem.

Finally, the traces are condensed onto the edge of the substrate so that the driving signals are smoothly connected to the anodes of the VCSEL array (because the separation between the VCSEL array bonding pads is only 250 μm). Finally, the VCSEL array chip is attached at the side face of substrate, so that a wrap-around pattern provides a smooth path to the transmitter. Using this pattern, different value resistors set the VCSEL bias conditions.

In the network switch node, the logical routing in each node 1000 is achieved by examining the address header bytes of the signal packet using VCSEL, micro-optics, and optical lookup table technologies to quickly decode the address header and let node 1000 autonomously decide where to send the packet in the network (e.g., to implement the self-routing switching mode). For example, consider an 8-bit address to describe the optical decoder technology.

In this regard, an 8-bit address header has 256 status that is divided into nine groups. The first group has only one status and all eight bits are zero. The second group has 8 status wherein only one bit is one, and the rest of the seven bits are zero. The third group has 28 status wherein only two bits are one, and the remaining six bits are zero. The fourth group has 56 status, wherein three of the eight bits are one, and the rest are zero. The fifth group has 70 status wherein four bits are one, and the other four bits are zero. The sixth group has 56 status wherein five bits are one, and three bits are zero. The seventh group has 28 status wherein six bits are one, and two bits are zero. The eighth group has 8 status wherein seven bits are one, and only one bit is zero. The ninth group has one status wherein all eight bits are one.

A 1×8 VCSEL array indicates the 8-bit address signal. The address signal drives the VCSEL array. Eight VCSELs corresponded to 8-bits. If the bit is one, the corresponding VCSEL is turned on. If the bit is zero, the corresponding VCSEL is off. The address bit pattern is duplicated 257 times through the use of microlens technology. The 256 duplicated address patterns are transmitted through an optical lookup table mask to make an optical comparison. After the mask, the signal pattern is detected by a photodetector. One duplicated address bit pattern is directly detected by a photodetector, which is the reference signal. The detected reference signal determines how many bits have the value "1". Using a mature comparator circuit, one of nine groups which have the same bits of "1" is selected.

The photodetector signal for this group is compared with the reference signal. The one photodetector that has the same detected level as the reference signal is selected. The selected photodetector excites the corresponding circuit to make the data packet "find" its way to its destination. In the preferred embodiment of the present invention, the optical light source is a multi-transverse mode VCSEL emitting at ~830 nm. The period of the VCSEL array is 250 μm. The two kinds of microlens used in node 1000 include a binary microlens and a GRIN lens array. The photomask for the decoder lookup table is fabricated by mature photomask technology. The additional mirrors fold the optical path to reduce the package size.

To further protect the components and meet the requirements of compactness, light weight, robustness, and ease of use, all the components (such as the VCSEL array, the microlens array, the mirror, the lookup table mask, and the photodetector array) are packaged into a metal cassette to guard against environmental influences (e.g., temperature variations, shock, humidity, and vibrations). The cassette has two openings for electrical plugs to connect the electrical power for the VCSEL array and to extract the signal from the photodetector. The case is compatible with standard circuit boards.

Design of an Optical Associative Memory Processor

Figure 13:
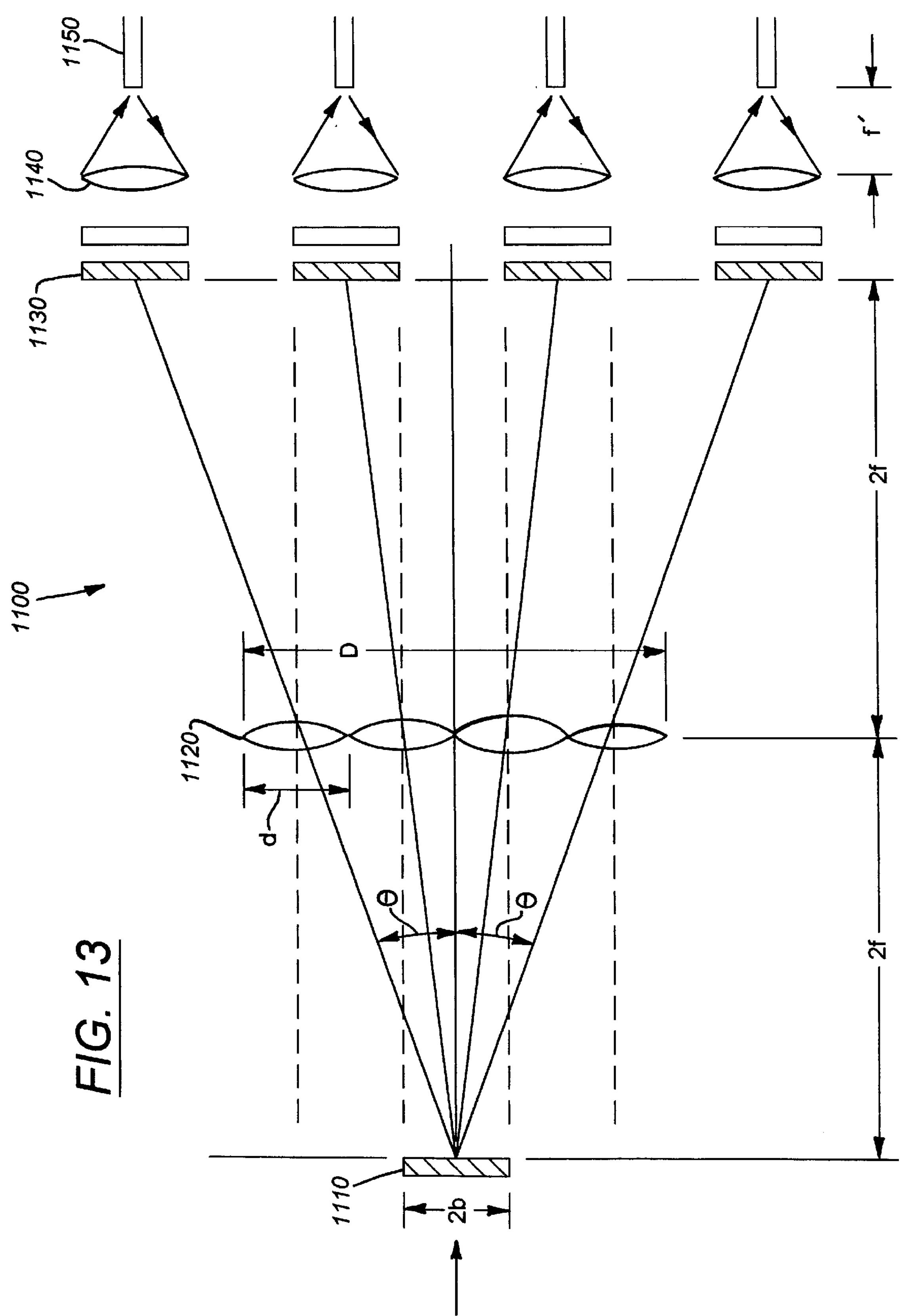
FIG. 13 is an exemplary illustration of an optical self-routing switching node according to the present invention.

FIG. 13 is an exemplary illustration of design considerations for an optical associative memory processor 1100. Optical associative memory processor 1100 includes a fiber array or VCSEL array 1110, lenslets 1120, masks 1130, focusing lenses 1140, and output fibers 1150. Assuming a 2f—2f imaging system, consider imaging equation:

$$\frac{1}{x}+\frac{1}{y}=\frac{1}{f} \quad (20)$$

The magnification is:

$$M=\frac{y}{x}=1 \quad (21)$$

The VCSEL divergence is 2θ and from FIG. 1:

$$D=2f \tan \theta \quad (22)$$

where D is the linear size of lenslet from the parallel condition:

$$b<<f \quad (23)$$

which is needed to obtain good image quality.

For lenslets 1120:

$$D=W_N \cdot d, \text{ for 1-D case} \quad (24)$$

$$D=\sqrt{W_N}d, \text{ for 2-D case} \quad (25)$$

In the 1-D case, N=1, M=2, and $W_N$=6. From Eq.(22):

$$2f \tan \theta=W_N \cdot d/2, \text{ or} \quad (26)$$

$$\frac{d}{f}=\frac{4\tan\theta}{W_N} \quad (27)$$

The right side of Eq. (27) is given. For example, for θ=15°, tan 15°=0.27, and from Eq. (27):

$$\frac{d}{f}=\frac{4\times 0.27}{6}=0.18 \quad (28)$$

or, $$f\#=\frac{f}{d}=5.55 \quad (29)$$

This is appropriate because f#>>1.

Assuming d=4 mm, then:

$$f=f\# \cdot d=5.55\times 4 \text{ mm}=2.2 \text{ cm} \quad (30)$$

and the length of imaging system is:

$$4f=4\times 2.2 \text{ cm}=8.8 \text{ cm}$$

Assuming for four VCSELs 2b=4×200 μm=800 μm=0.8 mm, then b=0.4 mm, and for f=2.2 cm:

$$\frac{b}{f}=\frac{0.4 \text{ mm}}{2.2 \text{ cm}}=0.02<<1 \quad (31)$$

Therefore, Eq. (23) is well satisfied.

Contrary to traditional cross-bar switches that map multiple inputs to multiple outputs (e.g., ∞ to ∞ relationship), the self-routing switching node in the present invention maps one input to multiple outputs (e.g., 1 to ∞ relationship), thereby resulting in high speed switching measured in nanoseconds, and a high fan-out (e.g., 1:1,000). The switch node in the present invention can be configured as a multiple input/multiple output switch (∞ to ∞) by placing a number of switches on a layer and then providing multiple layers, thereby resulting in a cross-bar array. Therefore, the self-routing switching node in the present invention is not classified as a cross-bar switch, but can be modified to fit the criteria of a cross-bar switch by providing multiple layers containing a number of switches.

The optical switching node in the present invention is a highly parallel switch that does not scan output by output, but rather processes all of the outputs at the same time and chooses an output based on the header addressing, which is contrary to the sequential logic processing found in electronic microprocessors. Therefore, the optical switching node in the present invention produces routing decisions for all of the input channels in one time step on the order of the bandwidth of the laser emitter and photodetector (~1 ns). Even when the time delays in the driving circuits of the laser emitter and photodetector are included, the header processing time in the present invention is ~10 ns.

The only switching element in the present invention is performed by the laser diode itself using the header and the matching filter based on noncoherent pattern recognition. Therefore, the speed is only limited by the switching speed of the laser diode based on noncoherent image association/associative memory techniques.

As discussed above, the basic memory in the present invention is based on noncoherent optical pattern recognition techniques. Traditionally, the use of light in a single beam defines coherence (e.g., state-of-the-art Fourier processing uses coherent optical imaging). The use of laser diodes in the present invention is a noncoherent approach based on optical beam coherence, but there is a sense of coherence in that the laser diodes act together in a coherent manner.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A self-routing switching node comprising:

a plurality of input fibers including a set of data packets;

a buffer memory unit wherein the set of data packets is temporarily stored and wherein a set of header bits associated with each data packet in the set of data packets is copied;

an optical heteroassociative data mapping processor that processes the copied set of header bits by converting a given input pattern into a corresponding output pattern based on a desired mapping algorithm, generates a set of memory control signals, and transmits the set of memory control signals to the buffer memory unit to access a set of desired data packets; and a switching array that receives the set of data packets from the plurality of output communication ports and routes the set of data packets based on a set of routing control signals from the data mapping processor.

2. A self-routing switching node according to claim 1, wherein the switching array is an optoelectronic switch array.

3. A self-routing switching node according to claim 1, wherein the set of data packets is represented by a high-speed bit-serial data stream that is converted to a bit-parallel data stream in the data mapping processor or the buffer memory unit.

4. A self-routing switching node comprising:

a plurality of input fibers including a set of optical data packets;

a plurality of input communication ports that convert the set of optical data packets into a set of electrical data packets;

a buffer memory unit wherein the set of electrical data packets is temporarily stored and wherein a set of header bits associated with each data packet in the set of electrical data packets is copied;

an optical heteroassociative data mapping processor that processes the copied set of header bits by converting a given input pattern into a corresponding output pattern based on a desired mapping algorithm, generates a set of memory control signals, and transmits the set of memory control signals to the buffer memory unit to access a set of desired data packets;

a plurality of output communication ports that converts the set of desired electrical data packets into an optical set of data packets;

a switching array that receives the optical set of data packets from the plurality of output communication ports and routes the optical set of data packets based on a set of routing control signals from the data mapping processor.

5. A switching node according to claim 4, wherein the set of memory control signals includes a set of new header data.

6. A switching node according to claim 4, wherein the switching array is an electronic switch array.

7. A self-routing switching node comprising:

a plurality of input fibers including a set of data packets;

a buffer memory unit wherein the set of data packets is temporarily stored and wherein a set of header bits associated with each data packet in the set of data packets is copied;

an optical digital heteroassociative data mapping processor that processes the copied set of header bits by converting a given input pattern into a corresponding output pattern based on a desired mapping algorithm, generates a set of memory control signals, and transmits the set of memory control signals to the buffer memory unit to access a set of desired data packets; and a switching array that receives the set of data packets from the plurality of output communication ports and routes the set of data packets based on a set of routing control signals from the data mapping processor.

8. A self-routing switching node according to claim 7, wherein the processor generates the set of routing control signals based on the set of header bits corresponding to each data packet, and the set of header bits includes a set of starting address bits, a set of destination address bits, a set of priority bits, and a set of status bits.

* * * * *